United States Patent
Camenisch

(10) Patent No.: US 8,595,143 B2
(45) Date of Patent: Nov. 26, 2013

(54) MAINTAINING PRIVACY FOR TRANSACTIONS PERFORMABLE BY A USER DEVICE HAVING A SECURITY MODULE

(75) Inventor: Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/562,940

(22) Filed: Jul. 31, 2012

(65) Prior Publication Data

US 2012/0297185 A1 Nov. 22, 2012

Related U.S. Application Data

(62) Division of application No. 12/547,051, filed on Aug. 25, 2009, now Pat. No. 8,285,647, which is a division of application No. 10/575,045, filed as application No. PCT/IB2004/002710 on Aug. 20, 2004, now Pat. No. 7,822,689.

(30) Foreign Application Priority Data

Oct. 17, 2003 (EP) .................................... 03405749

(51) Int. Cl.
*G06Q 99/00* (2006.01)
(52) U.S. Cl.
USPC ...... 705/71; 705/67; 380/1; 380/59; 713/169; 726/2
(58) Field of Classification Search
USPC .......... 705/67, 71; 380/1, 59; 713/169; 726/2
See application file for complete search history.

(56) References Cited

U.S. PATENT DOCUMENTS

| 4,748,668 A | 5/1988 | Shamir et al. |
| 5,604,805 A | 2/1997 | Brands |

(Continued)

FOREIGN PATENT DOCUMENTS

| JP | 2001186122 A2 | 7/2001 |
| JP | 2003258787 A | 9/2003 |

(Continued)

OTHER PUBLICATIONS

Camenisch et al. ("A Signature Scheme with Efficient Protocols", Camenisch and Lysyanskaya, Oct. 11, 2002, 22 pages).*

(Continued)

*Primary Examiner* — James D Nigh
(74) *Attorney, Agent, or Firm* — Cantor Colburn LLP; Vazken Alexanian

(57) ABSTRACT

A method and system for maintaining privacy for transactions performable by a user device having a security module with a privacy certification authority and a verifier are disclosed. The system includes an issuer providing an issuer public key; a user device having a security module for generating a first set of attestation-signature values; a privacy certification authority computer for providing an authority public key and issuing second attestation values; and a verification computer for checking the validity of the first set of attestation signature values with the issuer public key and the validity of a second set of attestation-signature values with the authority public key, the second set of attestation-signature values being derivable by the user device from the second attestation values, where it is verifiable that the two sets of attestation-signature values relate to the user device.

3 Claims, 2 Drawing Sheets

(56) References Cited

U.S. PATENT DOCUMENTS

| | | | |
|---|---|---|---|
| 5,633,929 A | | 5/1997 | Kaliski |
| 5,633,930 A | | 5/1997 | Davis et al. |
| 5,659,616 A | | 8/1997 | Sudia |
| 5,784,463 A | | 7/1998 | Chen |
| 6,442,525 B1 | | 8/2002 | Silverbrook et al. |
| 7,007,159 B2 | | 2/2006 | Wyatt |
| 7,010,684 B2 | | 3/2006 | DeTreville |
| 7,490,069 B2 | * | 2/2009 | Camenisch ............ 705/74 |
| 2002/0004900 A1 | * | 1/2002 | Patel ............... 713/155 |
| 2002/0049681 A1 | * | 4/2002 | Herreweghen ............ 705/64 |
| 2003/0037233 A1 | * | 2/2003 | Pearson ............. 713/156 |
| 2005/0216736 A1 | * | 9/2005 | Smith ............... 713/168 |
| 2007/0256125 A1 | * | 11/2007 | Chen et al. ............ 726/18 |

FOREIGN PATENT DOCUMENTS

| | | | | |
|---|---|---|---|---|
| WO | WO96/39765 A1 | * | 12/1996 | |
| WO | 0242935 A3 | | 5/2002 | |
| WO | WO 0242935 A2 | * | 5/2002 | ......... G06F 15/16 |
| WO | 2004104797 A1 | | 12/2004 | |

OTHER PUBLICATIONS

E. Brickell et al.; "Direct Anonymous Attestation*;" CCS'04, Oct. 25-29, 2004, Washington DC, USA, 14 pages.

J. Camenisch et al; "A Signature Scheme with Efficient Protocols;" IBM Research Laboratory, Zurich, Switerland, 2002, 22 pages.

J. Camenisch et al.; "Design and Implementation of the idemix Anonymous Credential System;" CCS 2002, Nov. 18-22, 2002; 11 pages.

A. Lysyanskaya; Signature Schemes and Applications to Cryptographic Protocol Design; Thesis Paper; MIT, Sep. 2002, 134 pages.

Trusted Computing Group; TPM v1.2 Specification Changes, A summary of changes with respect to the v1.1b TPM Specification; Oct. 2003, 14 pages.

Trusted Computing Group; TPM Main Part 1 Design Principles, Specification Version 1.2, Revision 62, Oct. 2003, 161 pages.

J. Wiley Ed.; Applied Cryptography, Second Edition, Protocols, Algormitms and Source Code in C; 1996; 6 pages.

* cited by examiner

MAINTAINING PRIVACY FOR TRANSACTIONS PERFORMABLE BY A USER DEVICE HAVING A SECURITY MODULE

CROSS-REFERENCE TO RELATED APPLICATIONS AND PRIORITY

This application is a divisional of U.S. patent application Ser. No. 12/547,051, filed Aug. 25, 2009 now U.S. Pat. No. 8,285,647, which is a divisional of U.S. patent application Ser. No. 10/575,045, filed Mar. 7, 2007, now U.S. Pat. No. 7,822,689, which claims priority to International Patent Application PCT/IB2004/002710, with international filing date of Aug. 20, 2004, and published in English with Publication No. WO2005/038634 on Apr. 28, 2005, under PCT article 21(2), which in turn claims priority of European Application, EP03405749.7, filed on Oct. 17, 2003, and all the benefits accruing therefrom under 35 U.S.C. §119, the contents of which in its entirety are herein incorporated by reference.

TECHNICAL FIELD

The present invention is related to a method and system for maintaining privacy in transactions performable by a user device having a security module with a privacy certification authority and a verifier. Moreover, the invention is also related to a computer program element for performing the method and a computer program product stored on a computer usable medium for causing a computer to perform the method.

BACKGROUND

Computers have evolved to tools for many applications and service. In today's world a trustworthy computing environment becomes more and more a desire. Comprehensive trust, security, and privacy functions are required to establish multi-party trust between devices, upon which content providers, application and service providers, consumers, enterprises and financial institutions, and particularly users can rely.

For that, a trusted platform module (TPM) has been established. The role of the module is to offer protected storage, platform authentication, protected cryptographic processes and attestable state capabilities to provide a level of trust for the computing platform. The foundation of this trust is the certification by a recognized authority that the platform can be trusted for an intended purpose. A so-called trusted computing group (TCG) will further develop and promote open industry standard specifications for trusted computing hardware building blocks and software interfaces across multiple platforms, including PC's, servers, PDA's, and digital phones. This will enable more secure data storage, online business practices, and online commerce transactions while protecting privacy and individual rights. Users will have more secure local data storage and a lower risk of identity theft from both external software attack and physical theft.

To realized the functionality of attestable states, an issuer issues a certificate to the trusted platform module, hereafter also abbreviated as TPM, as to allow the TPM to later prove that it is a genuine TPM and therefore a verifying party can have confidence stated attested by the TPM. To allow the TPM to prove it is genuine without that the verifying party can identify the TPM, a so-called direct anonymous attestation (DAA) protocol has been specified by the trusted computing group. The protocol allows the TPM to convince a verifying party that it obtained attestation by an issuer without revealing its identity. The protocol takes place in the following setting. The issuer has made available a public key $(n, R_0, R_1, S, Z)$. With each TPM a so-called endorsement key is associated. This key is an RSA encryption key pair, the secret key of which is available to the TPM. In order to get attestation, the TPM and the issuer run a first protocol. During the protocol, the TPM sends the issuer values $U = R_0^{f_0} R_1^{f_1} S^{v'} \mod n$ and $N_I = \zeta_I^{f_0 + k f_1}$, where k is a system parameter and $\zeta_I$ is a so-called named base value determined by the issuer. The value U is authenticated using the TPM's endorsement key. The TPM also proves to the issuer that $N_I$ is correctly computed w.r.t. U, i.e., that they contain the same values of f0 and f1. Having received U and $N_I$, the issuer chooses an appropriate prime e and a value v'', computes the value $A = (Z/US^{v''})^{(1/e)} \mod n$ and sends the TPM A, e, and v''. The TPM sets $v = v' + v''$. Thus it turns out that $A^e R_0^{f_0} R_1^{f_1} S^v = Z \pmod{n}$, i.e., the TPM has obtained attestation from the issuer.

Now, the TPM can convince the verifying party with a second protocol, herein also referred to DAA-sign operation, that it has obtained attestation without identifying itself. That is, the verifying party only receives a value $N_v$ that the TPM computed as $\zeta_v^{f_0 + k f_1}$, where k is the same system parameter and $\zeta_v$ is a base or named base value determined by the verifier, and a proof that the TPM possesses values A, e, v, f0, and f1 such that $A^e R_0^{f_0} R_1^{f_1} S^{V'} = Z \pmod{n}$ and $N_v = \zeta_v^{f_0 + k f_1}$ holds. It is noticed that the verifying party does not learn any of the values A, e, v, f0, and f1. The verifying party can either allow the TPM or the user's computer to choose the value $\zeta_v$ randomly, in which case the verifying party does not receive any information at all; or the verifying party can request that the value $\zeta_v$ be computed otherwise and fixed for a certain time period, in which case the verifying party is able to note whether the same TPM has contacted it before by checking whether it has seen a given $N_v$ before.

In the execution of these two protocols, also a platform that uses the TPM takes part. This platform receives values from the TPM, possibly modifies them, and forwards them to the issuer or the verifying party. The platform then receives (reply) messages from the issuer or the verifying party, possibly modifies them, and feeds them to the TPM.

Using the same $\zeta_v$ with all TMP's and for a certain time period allows the verifying party to monitor whether some TPM overuses the service provided by the verifying party through monitoring how often a given value $N_v$ is used and thus to identify TMP's that are no longer genuine. However, it also allows the verifying party to do profiling and thus to invade into the privacy of a TMP's user, which is not desirable.

From the above it follows that there is still a need in the art for an improved protocol that prevents profiling and maintains privacy for transactions performable by the user device with parties while still allowing the verifying party to monitor overuse and identify rogue TMP's.

SUMMARY

In the following are proposed a system and methods which prevent profiling and maintain privacy for transactions that are performed by a user device with a privacy certification authority and a verifier or verifying party, which typically is a verification computer. The user device has a security module, herein also referred to as trusted platform module (TPM), which allows platform authentication, protected cryptographic processes, and attestable state capabilities. In general, a frequency check is separated from the granting/request of a service, which is accessible upon a successful verification by the verifier. The privacy certification authority, that is a trusted third party (TTP), is used to perform the frequency check on the verifiers behalf and, if the check is successful, issues attestation values, e.g., as a token, to the user device and TPM that the user device with the TPM can then use to generate attestation-signature values to provide to the verifier and thereby convince the verifier that it has obtained such attestation values from the TPP. The token should be useable only once (or at least a limited number of times) and should preferably be such that it can only be used with a single verifier and such that even when the verifier and the TTP collude, they cannot link the request to the service with the transaction in which the token was granted to user device with the TPM. Thus, if the verifier trusts the TTP, it is assured that it will only receive attestation-signature values from user devices with the TPMs that have not overused its service. On the other hand, the user device with the TPM is guaranteed that the verifier cannot do profiling as they are assured that it cannot link the different service requests. Of course, the user device with the TPM should retrieve a fresh token from the TTP for each service request. The user with the user device does not need to trust the TTP, the TTP and the verifier could even be the same entity.

In accordance with the present invention, there is provided a system for maintaining privacy while computers performing transactions. The system comprises an issuer providing an issuer public key $PK_I$; a user device having a security module for generating a first set of attestation-signature values DAA1; a privacy certification authority computer for providing an authority public key $PK_{PCA}$ and issuing second attestation values AV2; and a verification computer for checking the validity of the first set of attestation-signature values DAA1 with the issuer public key $PK_I$ and the validity of a second set of attestation-signature values DAA2 with the authority public key $PK_{PCA}$, the second set of attestation-signature values DAA2 being derivable by the user device 20 from the second attestation values AV2, wherein it is verifiable that the two sets of attestation-signature values DAA1, DAA2 relate to the user device.

In accordance with a further aspect of the present invention, there is provided a method for maintaining privacy for transactions performable by a user device having a security module with a privacy certification authority computer and a verification computer, the verification computer having obtained public keys $PK_{PCA}$, $PK_I$ from the privacy certification authority computer and from an issuer that provides attestation of the security module. The method comprising the steps of:

receiving a first and second set of attestation-signature values DAA1, DAA2, the first set of attestation-signature values DAA1 being generated by the user device using first attestation values AV1 obtained from the issuer and the second set of attestation-signature values DAA2 being generated by the user device using second attestation values AV2 obtained from the privacy certification authority computer;

checking the validity of the first set of attestation-signature values DAA1 with the public key $PK_I$ of the issuer;

checking the validity of the second set of attestation-signature values DAA2 with the public key $PK_{PCA}$ of the privacy certification authority computer; and verifying whether or not the two sets of attestation-signature values DAA1, DAA2 relate to the user device.

The system and method allow maintaining privacy for transactions which are performed by the user device as they allow splitting misuse and a frequency check from the request of any access. It is further advantageous that profiling by any of the parties is prevented.

The step of verifying may comprise the step of verifying that a first value is derived from a base value, comprised in the first set of attestation-signature values DAA1, and identical to a second value that is derived from said base value and is comprised in the second set of attestation-signature values DAA2. This leads to a more secure system.

The step of verifying may comprise the step of verifying a proof that the two attestation-signature values DAA1, DAA2 are based on the first and second attestation values AV1, AV2 that are derived from at least one common value t. This again leads to a more secure system and allows the user device to handle the second attestation values AV2 and the second attestation-signature values DAA2 without using the security module.

The base value can be different each time the method is applied, which guarantees unlinkability of transactions.

The common value t might be derived from an endorsement key EK that is related to the security module. Also this leads to a more secure system, since the common value t is well defined and is assured to be different for each security module.

In accordance with another aspect of the present invention, there is provided a method for maintaining privacy for transactions performable by a user device having a security module with a privacy certification authority computer and a verification computer, the privacy certification authority computer having obtained a public key from an issuer that provides attestation of the security module. The method comprises the steps of:

receiving an initial set of attestation-signature values DAA1' from the user device, the initial set of attestation-signature values DAA1' being generated by the user device using first attestation values AV1 obtained from the issuer;

checking the validity of the initial set of attestation-signature values DAA1 with the public key of the issuer;

responsive to the checking step issuing second attestation values AV2 that relate to the initial set of attestation-signature values DAA1; and providing the second attestation values AV2 to the user device, a second set of attestation-signature values DAA2 being derivable from the second attestation values AV2, wherein it is verifiable that a first set of attestation-signature values DAA1 and the second set of attestation-signature values DAA2 relate to the user device, the first set of attestation-signature values DAA1 is generatable by the user device using first attestation values AV1 obtained from the issuer.

The step of issuing the second attestation values AV2 may further comprise the step of receiving a request value from the user device and verifying whether the request value relates to the initial set of attestation-signature values DAA1'.

In accordance with yet a further aspect of the present invention, there is provided a method for maintaining privacy for transactions performable by a user device having a security module with a privacy certification authority computer and an verification computer, the user device having obtained first attestation values AV1 from an issuer and second attestation values AV2 from the privacy certification authority computer. The method comprises the steps of:

generating a first set of attestation-signature values DAA1 by using the first attestation values AV1 and a second set of attestation-signature values DAA2 by using the second attestation values AV2; and sending the first and second set of attestation-signature values DAA1, DAA2 to the verification computer, wherein the verification computer is able to check the validity of the first set of attestation-signature values DAA1 with an issuer public key $PK_I$ of the issuer, the validity of the second set of attestation-signature values DAA2 with an authority public key $PK_{PCA}$ of the privacy certification authority computer, and to verify that the two sets of attestation-signature values DAA1, DAA2 relate to the user 30 device (20).

The step of generating can comprise using an endorsement key EK that is related to the security module.

BRIEF DESCRIPTION OF THE SEVERAL VIEWS OF THE DRAWINGS

Preferred embodiments of the invention are described in detail below, by way of example only, with reference to the following schematic drawings.

The drawings are provided for illustrative purposes only.

DETAILED DESCRIPTION

Figure 1:
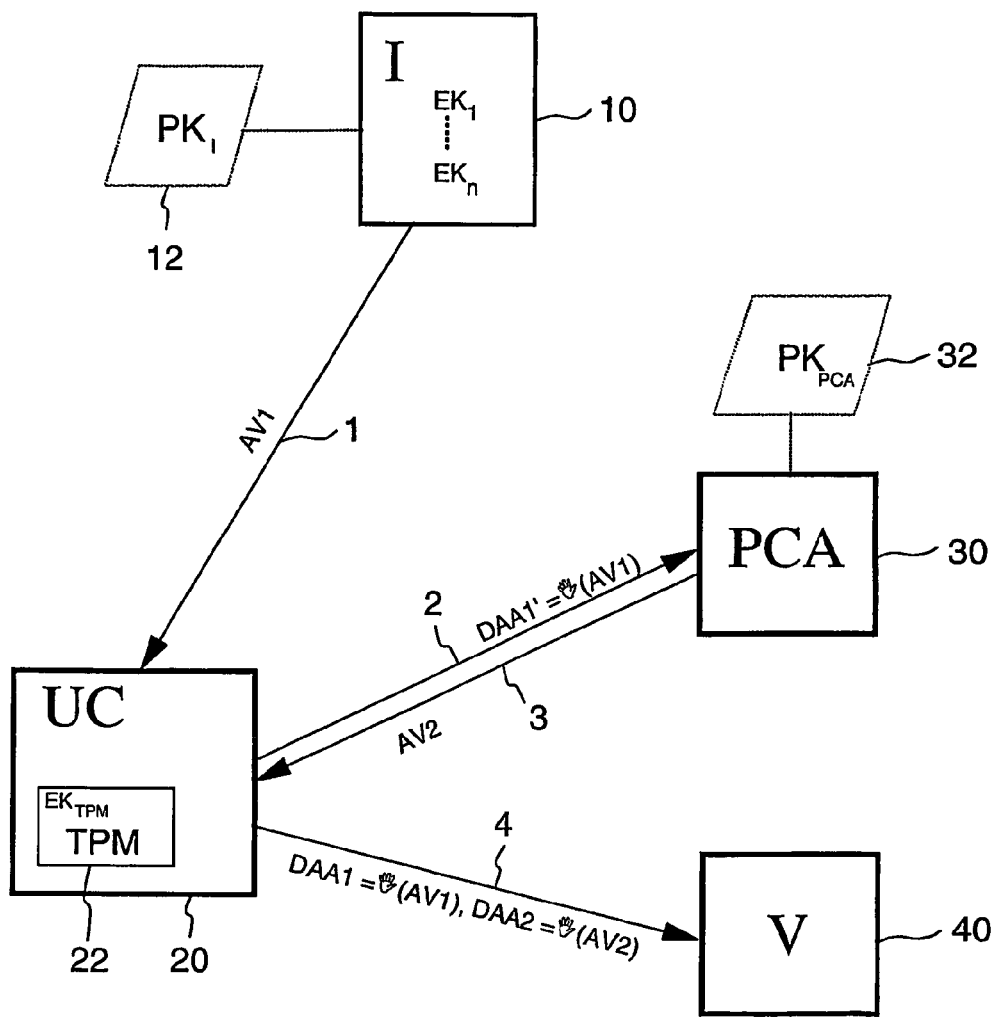
FIG. 1 shows a schematic illustration of a scenario with an issuer, a user computer having a trusted platform module, a privacy certification authority, and a verifier.

FIG. 1 shows a schematic illustration of a scenario with an issuer 10 and a user device 20 comprising a security module 22, that typically is a part of a user's computer. The user device 20, also labeled with UC, is connected to a privacy certification authority computer 30, also labeled as PCA, and a verification computer 40, labeled with V.

The issuer 10 provides an issuer public key $PK_I$ to the public, as indicated with a dotted parallelogram 12 that is labeled with $PK_I$, and holds a list of endorsement keys $EK_1 \ldots EK_n$, each allocated to one security module comprised in a user device. Further, the issuer 10 provides to the user device 20 with the security module 22 one particular endorsement key $EK_{TPM}$. Moreover, as indicated on arrow 1, attestation values AV1 are provided from the issuer 10 to the user device 20. The privacy certification authority computer 30 provides also a public key to the public, that here is called authority public key $PK_{PCA}$, as indicated with a further dotted parallelogram 32 that is labeled with $PK_{PCA}$. The user device 20 with the security module 22, also labeled with TPM, generates a first set of attestation-signature values DAA1 and sends these, as indicated by arrow 2 with "DAA1'=(AV1)", to the privacy certification authority computer 30 which then issues second attestation values AV2 back to the user device 20, as indicated by arrow 3. The open-hand symbol indicates here showing the respective values to another party, which can be contemplated as token or signature.

The user device 20 with the security module 22 generates the first set of attestation-signature values DAA1 by using the first attestation values AV1, also referred to as issuer token AV1, and generates a second set of attestation-signature values DAA2 by using the second attestation values AV2, received from the privacy certification authority computer 30. The first and second set of attestation-signature values DAA1, DAA2 are then sent to the verification computer 40, as indicated by arrow 4 with "DAA1=(AV1),DAA2=(AV2)" in the figure. The verification computer 40 is able to check the validity of the first set of attestation-signature values DAA1 with the issuer public key PK, of the issuer 10, the validity of the second set of attestation-signature values DAA2 with the authority public key $PK_{PCA}$ of the privacy certification authority computer 30, and to verity that the two sets of attestation-signature values DAA1, DAA2 relate to the user device 20. By showing the first set of attestation-signature values DAA1 to the verification computer 40, the user device 20 can indicate the possession of the second attestation values AV2, the so-called authority token AV2. The following describes in more detail the implementation of the proposed method for maintaining privacy for transactions performable by the user device 20 with the privacy certification authority computer 30 and the verification computer 40. The verification computer 40, hereafter short verifier 40, may provide after a successful verification access to a service, data, or information.

When the user device 20 with the security module 22, hereafter also referred to as trusted platform module (TPM), obtained attestation from the issuer 10, the issuer 10 computes a value A differently, i.e., it chooses some common value t that is unique for the user device 20 (e.g., t could be the hash of the TMP's endorsement key), and computes $A=(Z/US^{v''}R_2^{t})^{(1/e)} \mod n$, where $R_2$ is an additional base value that is now also part of the issuer public key $PK_I$. That is, the first attestation values AV1 are (A,e,v'') and are send to the user device 20 together with the value of t, where the common value t is not forward to the TPM. Next, the user device 20 contacts the privacy certification authority computer 30, hereafter also referred to as third trusted party (TTP), and uses the DAA-sign operation of the TPM to convince the TTP that it obtained attestation from the issuer 10. However, the user device 20, also referred to as platform, hosting the TPM modifies the messages received from the TPM as to reflect the parameter t and the fact that the value A was differently computed by the issuer 10. Also, the part of the DAA-sign operation run by the TTP is modified to reflect these changes. Here, the TTP uses a named base value $\zeta_v$ that is the same with all TPMs, and thus user devices, and for a sufficiently long time-period so that the TTP can determine whether the TTP or user devices are still valid, i.e., whether it has not seen a particular value of $N_v$ too often. Then the TTP issues the user device 20 with the TPM the second attestation values AV2, also regarded as authority token AV2, that is related to the common value t of the TPM.

This authority token AV2 should be issued in a way such that 1) the TTP does not learn any useful information about the common value t, 2) when the user device 20 uses the authority token AV2 with a verifier that use cannot be linked to the transaction in which the TTP of the user device 20 issued the authority token AV2, 3) the verifier 40 can verify that the authority token AV2 the user device 20 or TPM uses is related to some common value t that is comprised in the attestation the user device 20 obtained from the issuer 10, and 4) the user device 20 can use the authority token AV2 only once and only with a given verifier.

These properties can in principle be achieved using so-called blind signature schemes, where the TTP blindly signs a message that depends on the common value t, the targeted verifier's identifier and possibly some random number chosen by the platform, i.e. the user device 20. The values received by the user device 20 are the second attestation values AV2, also referred to as authority token AV2. The user device 20 then tries to convince the TTP that the message indeed depends on the common value t. Such blind signature protocols ensure that the TTP does not learn the message nor its signature. Thus, the user device 20 with the TPM can contact any verifier 40, execute the DAA-sign operation with the verifier 40 to obtain the first set of attestation-signature values DAA1 (where again, the user device 20 modifies the messages obtained by the TPM suitably as to reflect that A was computed using the common value t), where the named base value $\zeta_v$ should be random so that the verifier 40 cannot link different requests by the same user device 20 or TPM. Furthermore, the user device 20 sends the verifier 40 the message and its signatures as second set of attestation-signature values DAA2 it obtained from the TTP through the blind-signing protocol, and convinces the verifier 40 that the message is based on the common value t that is also contained in the attestation values AV1 obtained by the issuer 10 (upon which the first set of attestation-signature values DAA2 is based), the verifier's identifier and possibly some random number, where the random number can be learned by the verifier 40. If the verifier 40 has not seen the same random number (or the same message-signature pair) before, it grants the request. Otherwise it rejects it.

Instead of using a blind signature scheme, the privacy certification authority computer 30, i.e. the TTP, could also use the following modification of the DAA-scheme. Let (n, $R_0$, $R_1$, $R_2$, $R_3$, S, Z) be the authority public key $PK_{PCA}$ of the TTP. Then, the user device 20 with the TPM computes $U = R_0^{a} R_1^{b} R_2^{t} R_3^{w} S^{c'}$ and $N_I = \zeta_I^{a} = kb$, where a, b, and, c' are random values chosen by the user device 20, w is a value that depends on the targeted verifier and some random value r, e.g., w=SHA1(verifier_id, r), where SHA1 is a one-way hash function and $\zeta_I$ is determined by the TTP. For these steps, the user device 20 could also involve the TTP. Next, the user device 20 runs the DAA-sign operation w.r.t. the attestation values AV1 obtained from the issuer 10 and proves to the TTP that U and $N_I$ were computed correctly, in particular that U comprises the same common value t as contained in the attestation values AV1 the user device 20 has obtained from the issuer 10 and from which the attestation-signature values DAA1' are generated that the user device sent to the TTP. For this DAA-sign operation, the user device 20 should again modify the messages from the TTP as to reflect that the issuer 10 computes A using t. After this, the TTP choose a suitable e and c", computes $A = (Z/US^{c''})^{(1/e)} \mod n$ and sends A, e, and c" as second attestation values AV2 to the user device 20. Having obtained these values, the user device 20 now can contact the verifier 10 and execute the DAA-sign operation (using the TPM as necessary), where the user device 20 modifies the messages from the TPM as to reflect that A (and possibly A) got computed involving t (and w). For these DAA-sign operations the named base value $\zeta_v$ should be random. Also, the user device 20 sends the verifier 40 w and r, so that the verifier 40 can verify that w was computed correctly, and that it is contained in the attestation the user device 20 obtained from the TTP. Finally, the user device 20 proves to the verifier 40 that the attestation it obtained from the issuer 10 as well as the one it has obtained from the TTP comprises the same common values t. This proof can easily be performed by slightly adapting the DAA-sign operation, i.e., by the user device 20 choosing all values related to the common value t to be identical in both these DAA-sign operations and by the verifier 40 checking that these values are indeed identical.

Figure 2:
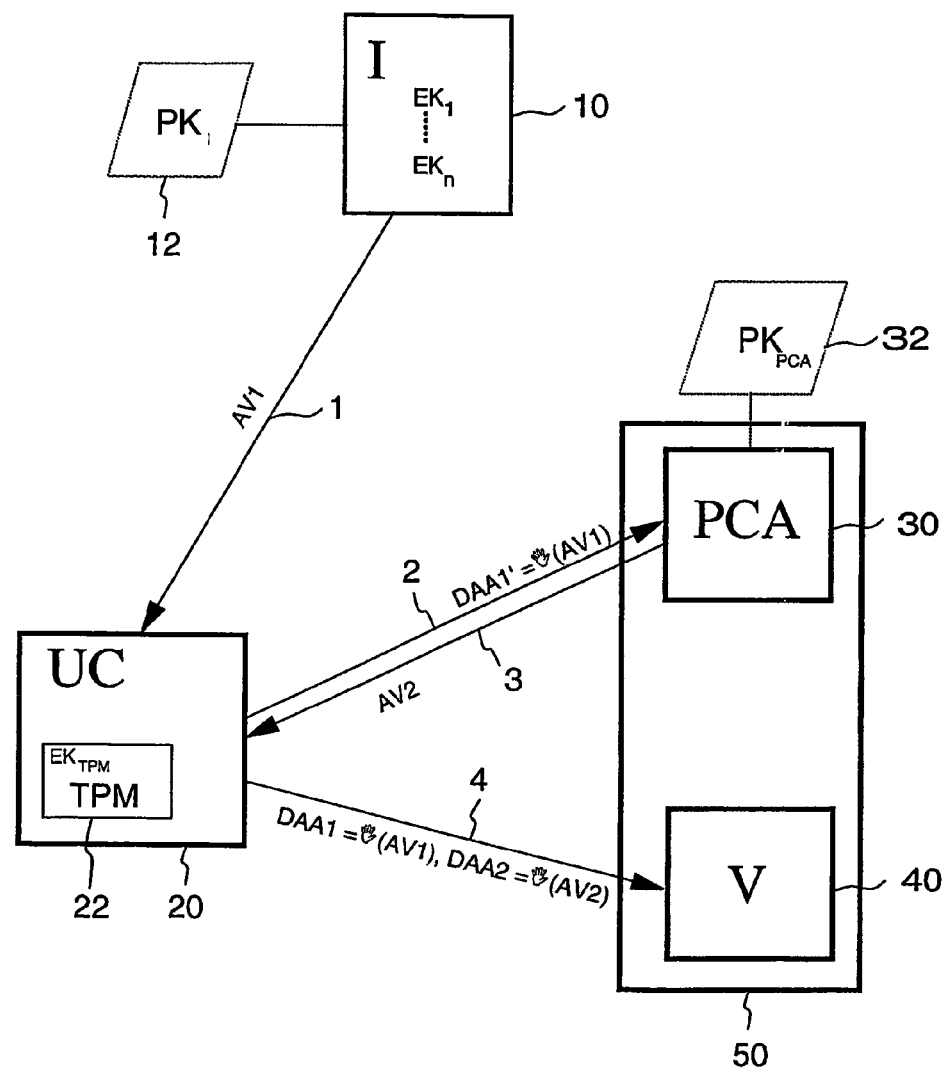
FIG. 2 shows the schematic illustration of FIG. 1 with the privacy certification authority and the verifier forming an entity.

As the user with the user device 20 no longer needs to thrust the TTP, i.e. the privacy certification authority computer 30, that the TTP does not collude with the verifier 40, both entities could be incorporated into a single entity. FIG. 2 shows such a further embodiment in which the privacy certification authority 30 and the verification computer 40 form an entity 50. This might be advantageous for specific applications or services.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A system for maintaining privacy while computers perform transactions comprising:
    an issuer providing an issuer public key to a verification computer and first attestation values to a user device;
    the user device having a security module configured to generate a first set of attestation-signature values based on the first attestation values, provide the first set of attestation-signature values to a privacy certification authority computer, and provide the first set of attestation-signature values and a second set of attestation-signature values based on second attestation values to the verification computer;
    the privacy certification authority computer configured to provide an authority public key to the verification computer and issue the second attestation values to the user device based on the first set of attestation-signature values; and
    the verification computer configured to check the validity of the first set of attestation-signature values with the issuer public key and the validity of the second set of attestation-signature values with the authority public key, and verify that the first and second sets of attestation-signature values relate to the user device.

2. A method for maintaining privacy while computers perform transactions comprising:
    providing an issuer public key by an issuer to a verification computer;
    providing first attestation values by the issuer to a user device;
    generating a first set of attestation-signature values based on the first attestation values by the user device, the user device comprising a processor having a security module executable by the processor;
    providing the first set of attestation-signature values by the user device to a privacy certification authority computer;
    issuing second attestation values by the privacy certification authority computer, the privacy certification authority computer comprising a processor and instructions executable by the processor to issue the second attestation values based on the first set of attestation-signature values, provide the second attestation values to the user device, and provide an authority public key to the verification computer;

generating a second set of attestation-signature values based on the second attestation values by the user device;

providing the first and second sets of attestation-signature values by the user device to the verification computer;

checking validity of the first set of attestation-signature values with the issuer public key and validity of the second set of attestation-signature values with the authority public key by the verification computer in response to execution of instructions by a processor of the verification computer; and verifying by the verification computer that the first and second sets of attestation-signature values relate to the user device.

3. A computer-readable storage medium comprising computer executable instructions which when executed by computers cause the computers to perform a method comprising:

providing an issuer public key by an issuer to a verification computer;

providing first attestation values by the issuer to a user device;

generating a first set of attestation-signature values based on the first attestation values by the user device having a security module;

providing the first set of attestation-signature values by the user device to a privacy certification authority computer;

providing an authority public key by the privacy certification authority computer to the verification computer;

issuing second attestation values by the privacy certification authority computer to the user device based on the first set of attestation-signature values;

providing the second attestation values by the privacy certification authority computer to the user device;

generating a second set of attestation-signature values based on the second attestation values by the user device;

providing the first and second sets of attestation-signature values by the user device to the verification computer;

checking validity of the first set of attestation-signature values with the issuer public key and validity of the second set of attestation-signature values with the authority public key by the verification computer; and verifying by the verification computer that the first and second sets of attestation-signature values relate to the user device.

\* \* \* \* \*